United States Patent
Moss et al.

(10) Patent No.: US 12,179,526 B2
(45) Date of Patent: Dec. 31, 2024

(54) NON-PNEUMATIC TIRE AND METHOD OF MANUFACTURE THEREOF

(71) Applicant: The Carlstar Group LLC, Franklin, TN (US)

(72) Inventors: Tim Moss, Seattle, WA (US); Bruce Li Wang, Oak Ridge, TN (US)

(73) Assignee: The Carlstar Group LLC, Franklin, TN (US)

( * ) Notice: Subject to any disclaimer, the term of this patent is extended or adjusted under 35 U.S.C. 154(b) by 807 days.

(21) Appl. No.: 17/187,656

(22) Filed: Feb. 26, 2021

(65) Prior Publication Data

US 2021/0260921 A1 Aug. 26, 2021

Related U.S. Application Data

(60) Provisional application No. 62/981,935, filed on Feb. 26, 2020.

(51) Int. Cl.
  *B60C 7/20* (2006.01)

(52) U.S. Cl.
  CPC .................................... *B60C 7/20* (2013.01)

(58) Field of Classification Search
  CPC .................................... B60C 7/20; B60C 7/14
  See application file for complete search history.

(56) References Cited

U.S. PATENT DOCUMENTS

| | | | | |
|---|---|---|---|---|
| 1,192,764 | A | * | 7/1916 | Dorn .......................... B60C 7/20 152/286 |
| 1,790,992 | A | * | 2/1931 | Matlock .................... B60C 7/20 152/286 |
| 6,460,586 | B1 | | 10/2002 | Spragg et al. |
| 6,769,465 | B2 | | 8/2004 | Rhyne et al. |
| 7,418,988 | B2 | * | 9/2008 | Cron .......................... B60C 9/18 152/5 |
| 8,931,531 | B2 | * | 1/2015 | Kubeck ..................... B60C 7/18 152/88 |
| 8,962,120 | B2 | * | 2/2015 | Delfino ..................... B60B 9/02 428/66.6 |
| 9,290,053 | B2 | | 3/2016 | Choi et al. |
| 10,538,130 | B2 | * | 1/2020 | Kim .......................... B60C 7/14 |
| 2009/0173421 | A1 | * | 7/2009 | Love .......................... B60C 7/18 152/11 |
| 2011/0240193 | A1 | | 10/2011 | Matsuda et al. |
| 2012/0234444 | A1 | | 9/2012 | Palinkas et al. |
| 2013/0240272 | A1 | | 9/2013 | Gass et al. |
| 2017/0008341 | A1 | * | 1/2017 | Martin ................... B60C 7/107 |
| 2018/0170109 | A1 | | 6/2018 | Delfino |
| 2019/0001749 | A1 | | 1/2019 | Rhyne et al. |
| 2019/0299717 | A1 | * | 10/2019 | Celik ........................ B60C 7/14 |
| 2020/0139764 | A1 | | 5/2020 | Lopez et al. |
| 2020/0316998 | A1 | | 10/2020 | Rhyne et al. |

* cited by examiner

*Primary Examiner* — Jason R Bellinger
(74) *Attorney, Agent, or Firm* — Saul Ewing LLP; Sean P. Ritchie

(57) ABSTRACT

A non-pneumatic tire is provided. The non-pneumatic tire includes an outer annular portion, an inner annular portion, and a load bearing ring positioned between the outer annular portion and the inner annular portion, the load bearing ring including an inner layer of matrix material, an outer layer of matrix material, and a wave shaped spring positioned between the inner layer of matrix material and the outer layer of matrix material.

20 Claims, 6 Drawing Sheets

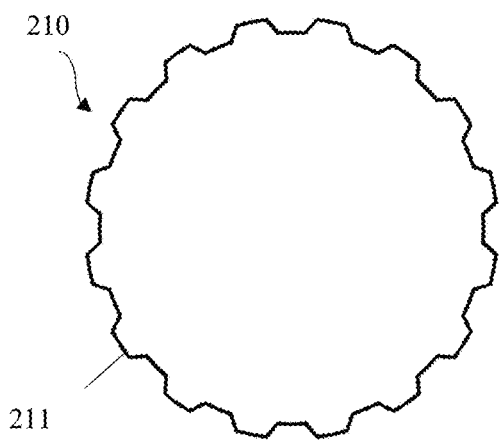
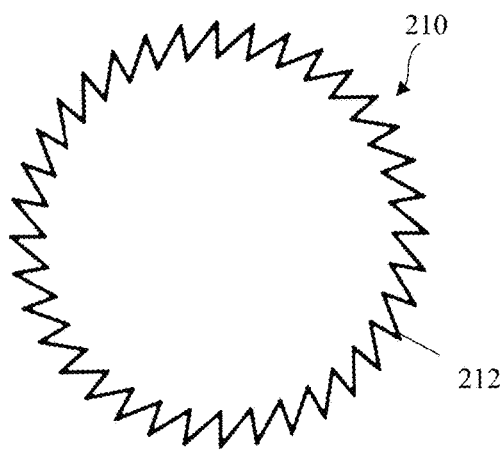
FIG. 3A                FIG. 3B
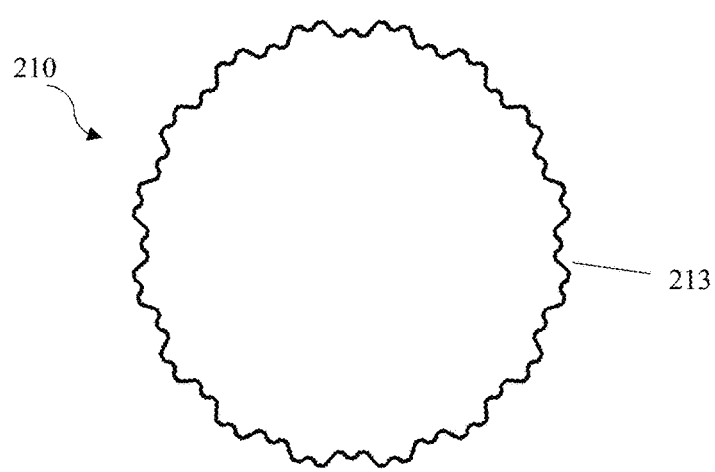
FIG. 3C

NON-PNEUMATIC TIRE AND METHOD OF MANUFACTURE THEREOF

RELATED APPLICATIONS

This application claims the benefit of U.S. Provisional Application Ser. No. 62/981,935, filed Feb. 26, 2020, the entire disclosure of which is incorporated herein by this reference.

TECHNICAL FIELD

The present disclosure is directed to a non-pneumatic tire and methods of producing the same. In particular, the disclosure is directed to a non-pneumatic tire including a continuous-wave shaped composite spring and methods of producing the same.

BACKGROUND

For over a century most vehicles have relied primarily on the use of pneumatic tires. While there are various differences in construction, all pneumatic tires include an internal cavity that is filled with pressurized air. When properly inflated these tires effectively support the applied load of a vehicle while providing a comfortable ride for the passengers. However, not only does inflation need to be monitored to maintain ride comfort and fuel economy, over- or under-inflation of pneumatic tires can be dangerous. Additionally, even with proper inflation, pneumatic tires are susceptible to failures such as punctures, blowouts, and tears. After loss of inflation pressure, whether due to puncture, tears, or normal wear, conventional pneumatic tires are capable of very limited use.

In an attempt to address these issues, various different "run flat" tires have been designed that run in an uninflated or underinflated condition for extended periods of time. For example, one type of run flat tire is a "banded run flat tire," which includes an annular band element that acts as a tension member when the tire is pressurized and a structural compression member when the tire is unpressurized or partially pressurized. Although banded run flat tires allow continued short term use after loss of pressurized air, such as that resulting from a puncture, the constant change in axial geometry can lead to interlaminar shear stress and fracture of the band. More specifically, as the tire rotates the axial geometry of the band constantly changes from circular to flat, which causes the fibers along the inside and outside diameter of the band to elongate and shorten, respectively. Under uninflated conditions this elongation and shortening is significantly increased due to more deflection in the sidewalls, impacting durability and leading to quicker fracture. Therefore, as a hybrid of an otherwise pneumatic tire structure, these tires still rely upon inflation pressure and the drawbacks associated therewith.

Non-pneumatic tires, on the other hand, do not rely on air pressure at all. One example of a non-pneumatic tire is a solid tire. While solid tires do not rely on air pressure for support, they also do not have the flexibility of pneumatic tires and thus lack desirable cushioning and handling characteristics. Another example combines an annular band with spokes connecting the band to an inner annular member or hub. Although these band and spoke tires offer improved cushioning over solid non-pneumatic tires, they still suffer from ride comfort and durability issues.

Accordingly, there remains a need in the art for durable non-pneumatic tires that provide a comfortable ride.

SUMMARY

The presently-disclosed subject matter meets some or all of the above-identified needs, as will become evident to those of ordinary skill in the art after a study of information provided in this document.

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature (s) mentioned; likewise, those features can be applied to other embodiments of the presently-disclosed subject matter, whether listed in this summary or not. To avoid excessive repetition, this summary does not list or suggest all possible combinations of such features.

In some embodiments, the presently-disclosed subject matter includes a non-pneumatic tire including an outer annular portion, an inner annular portion, and a load bearing ring positioned between the outer annular portion and the inner annular portion, the load bearing ring including an inner layer of matrix material, an outer layer of matrix material, and a wave shaped spring positioned between the inner layer of matrix material and the outer layer of matrix material. In some embodiments, a tensile modulus of the wave shaped spring is at least five times a tensile modulus of at least one of the inner layer of matrix material, the outer layer of matrix material, and an average of the inner layer of matrix material and the outer layer of matrix material. In some embodiments, a tensile modulus of the wave shaped spring is at least ten times a tensile modulus of at least one of the inner layer of matrix material, the outer layer of matrix material, and an average of the inner layer of matrix material and the outer layer of matrix material. In some embodiments, the wave shape spring comprises a tensile modulus, at 10% strain, of at least 50 MPa. In some embodiments, at least one of the inner layer of matrix material and the outer layer of matrix material includes a tensile modulus, at 10% strain, of between 0.1 MPa and 500 MPa. In some embodiments, the wave shaped spring comprises a material selected from the group consisting of metal, thermoplastic, thermoset, continuous fiber, discontinuous fiber, and combinations thereof. In some embodiments, the wave shaped spring comprises a waveform shape selected from the group consisting of sinusoidal, triangular sinusoidal, square sinusoidal, trapezoidal sinusoidal, pulse sinusoidal, hexagonal sinusoidal, sawtooth sinusoidal, multivariate sinusoidal, helical, and combinations thereof. In some embodiments, at least one of frequency, amplitude, wavelength, thickness, and width varies throughout the wave shaped spring.

In some embodiments, the inner layer of matrix material is selected from the group consisting of thermoplastics, thermosets, composites, and combinations thereof. In some embodiments, the outer layer of matrix material is selected from the group consisting of thermoplastics, thermosets, composites, and combinations thereof. In some embodiments, the inner layer of matrix material and the outer layer of matrix material are the same material. In some embodiments, the inner layer of matrix material and the outer layer of matrix material are the different materials. In some embodiments, the outer layer of matrix material has a Poisson ratio of less than or equal to 0. In some embodiments, the inner layer of matrix material has a Poisson ratio of greater than 0.

In some embodiments, the outer annular portion comprises a material selected from the group consisting of thermoplastics, thermosets, composites, and combinations thereof. In some embodiments, the inner annular portion comprises a material selected from the group consisting of metal, polymer, composite, ceramic, and combinations thereof. In some embodiments, the load bearing ring comprises at least one additional wave shaped spring. In some embodiments, the wave shape spring and the at least one additional wave shaped spring are selected from the group consisting of concentric, adjacent, and a combination thereof. In some embodiments, the non-pneumatic tire further includes webbing between the load bearing ring and the inner annular portion.

Also provided herein, in some embodiments, is a non-pneumatic tire including an outer annular portion including a material selected from the group consisting of thermoplastics, thermosets, composites, and combinations thereof; an inner annular portion including a material selected from the group consisting of metal, polymer, composite, ceramic, and combinations thereof; and a load bearing ring positioned between the outer annular portion and the inner annular portion, the load bearing ring including an inner layer of matrix material having a Poisson ratio of greater than 0; an outer layer of matrix material having a Poisson ratio of less than or equal to 0; and a wave shaped spring positioned between the inner layer of matrix material and the outer layer of matrix material, the wave shaped spring comprising a tensile modulus, at 10% strain, of at least 50 MPa; wherein a tensile modulus of the wave shaped spring is at least five times a tensile modulus of the inner layer of matrix material and the outer layer of matrix material; and wherein the wave shaped spring comprises a waveform shape selected from the group consisting of sinusoidal, triangular sinusoidal, square sinusoidal, trapezoidal sinusoidal, pulse sinusoidal, hexagonal sinusoidal, sawtooth sinusoidal, multivariate sinusoidal, helical, and combinations thereof.

Further features and advantages of the presently-disclosed subject matter will become evident to those of ordinary skill in the art after a study of the description, figures, and non-limiting examples in this document.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein:

FIGS. 3A-C show various wave shapes according to embodiments of the disclosure. (A) Hexagonal wave shape. (B) Sawtooth wave shape. (C) Multivariate wave shape.

Figure 1:
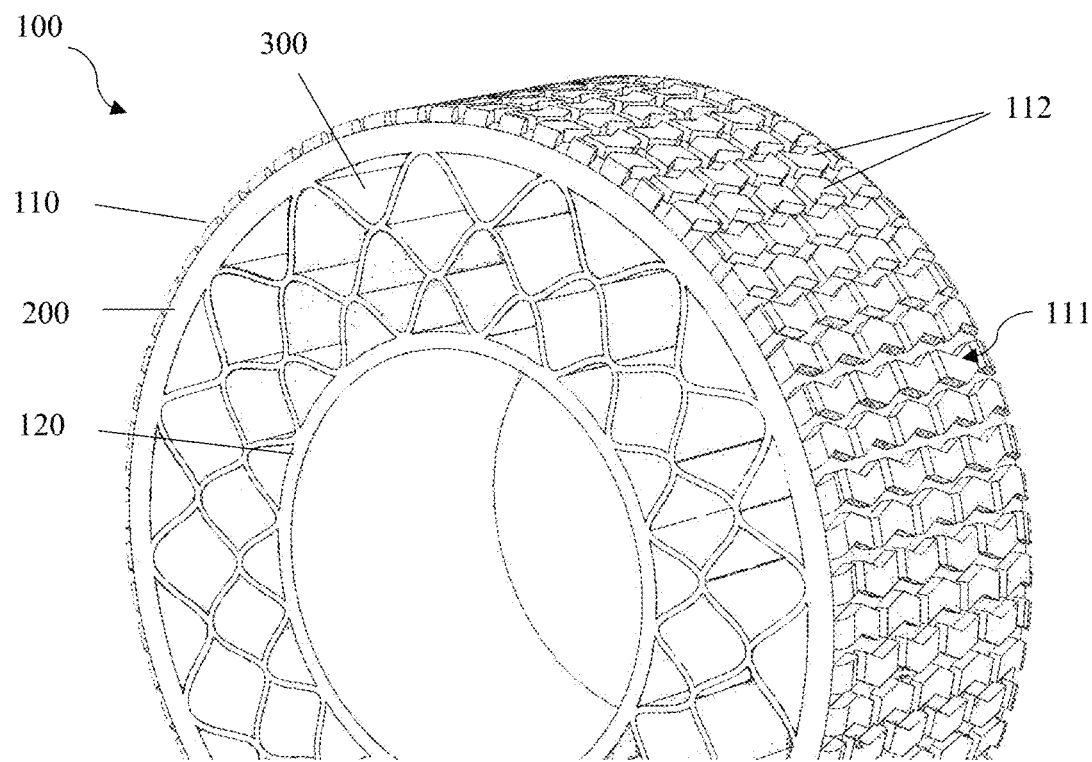
FIG. 1 shows a perspective view of a tire with wave shaped webbing.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DEFINITIONS

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials are described below.

Following long-standing patent law convention, the terms "a," "an," and "the" refer to "one or more" when used in this application, including the claims. Thus, for example, reference to "a cell" includes a plurality of cells, and so forth.

The terms "comprising," "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

All combinations of method or process steps as used herein can be performed in any order, unless otherwise specified or clearly implied to the contrary by the context in which the referenced combination is made.

As used herein, the terms "optional" or "optionally" means that the subsequently described event or circumstance can or cannot occur, and that the description includes instances where said event or circumstance occurs and instances where it does not.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Provided herein are a non-pneumatic tire and methods of making the same. Referring to FIG. 1, in some embodiments, the non-pneumatic tire 100 includes an outer annular portion 110, an inner annular portion 120, and a load bearing ring 200 positioned therebetween. The outer annular portion 110 forms an outer surface of the tire. In some embodiments, the outer annular portion 110 has a tensile modulus, at 10% strain, of between 0.1 and 100 MPa, between 0.1 and 75 MPa, between 0.1 and 50 MPa, between 0.1 and 40 MPa, between 0.1 and 30 MPa, between 0.1 and 25 MPa, between 0.1 and 20 MPa, between 0.2 and 100 MPa, between 0.2 and 50 MPa, between 0.2 and 30 MPa, between 0.2 and 25 MPa, between 0.2 and 20 MPa, between 0.3 and 100 MPa, between 0.3 and 50 MPa, between 0.3 and 30 MPa, between 0.3 and 25 MPa, between 0.3 and 20 MPa, between 0.4 and 100 MPa, between 0.4 and 50 MPa, between 0.4 and 30 MPa, between 0.4 and 25 MPa, between 0.4 and 20 MPa, or any combination, sub-combination, range, or sub-range thereof. In one embodiment, for example, the outer annular portion 110 has a tensile modulus of between 0.2 and 50 MPa at 10% strain. In another embodiment, the outer annular portion 110 has a tensile modulus of between 0.4 and 20 MPa at 10% strain. Such outer annular portions may be formed from any suitable material known in the art. Suitable materials of the outer annular portion 110 include, but are not limited to, thermoplastics (e.g., nylon, polyesters, TPU, olefins), thermosets (e.g., polyurethane (PU), rubber, epoxy, unsaturated polyesters, silicone), composites, or a combination thereof.

In some embodiments, the outer annular portion 110 is one layer and includes any suitable tread pattern 111 formed therein. For example, in one embodiment, the outer annular portion 110 includes one or more tread blocks 112. In some embodiments, the outer annular portion 110 includes an external surface layer and one or more sub-surface layers. The external surface layer is continuous or segmented, and is arranged and disposed to contact the ground and includes any suitable geometry for forming the tread pattern 111. For example, the external surface layer may include a smooth geometry, a patterned geometry (e.g., lugs, sipes), or any other suitable geometry for forming a tread pattern 111. The one or more sub-surface layers are radially positioned beneath the external surface layer. Each of the external surface layer and the one or more sub-surface layers is formed from any of the outer annular portion materials disclosed herein, and may be formed from the same material or a different material. For example, in one embodiment, the sub-surface layer(s) may be formed from a different thermoplastic, thermoset, or combination thereof, as compared to the external surface layer. Additionally or alternatively, one or more of the sub-surface layers may be reinforced with a fabric, continuous fiber, discontinuous fiber, metal, any other suitable reinforcing material, or a combination thereof.

Each external surface layer and one or more sub-surface layers, when present, independently includes any modulus disclosed herein for the outer annular portion 110. In some embodiments, the external surface layer and the one or more sub-surface layers include the same tensile modulus. Alternatively, in some embodiments, the external surface layer includes a lower tensile modulus than the one or more sub-surface layers. For example, in one embodiment, the external surface layer includes one or more rubber tread blocks with a tensile modulus of between 0.4 and 20 MPa, and the sub-surface layer includes a polyurethane with a tensile modulus of between 0.1 and 75 MPa. In another embodiment, the external surface layer is a retread layer and the sub-surface layer is a previous and/or buffed tread layer, the retread layer and the previous/buffed tread layer including the same or different materials.

In some embodiments, the inner annular portion 120 is in direct contact with a wheel hub. Alternatively, in some embodiments, the inner annular portion 120 is the wheel hub. The inner annual portion 120 is formed from any suitable material for contacting or forming the wheel hub. Suitable materials for the inner annual portion 120 include, but are not limited to, metal, polymer, composite, ceramic, any other suitable material, or a combination thereof.

Figure 2:
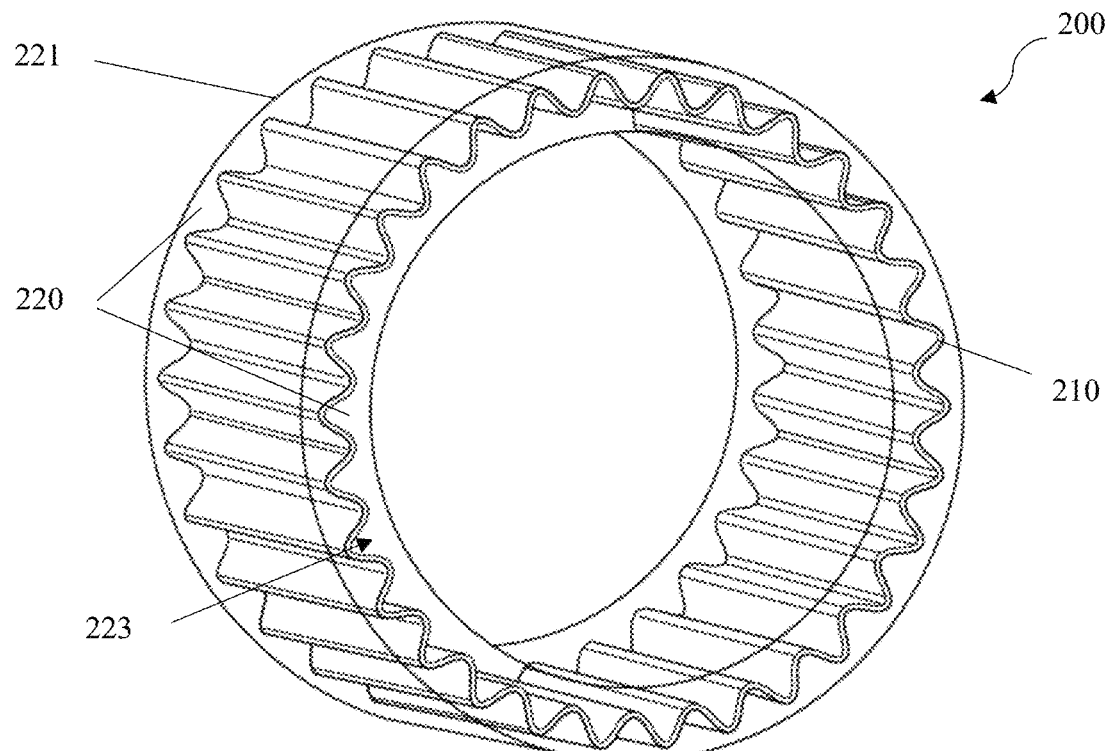
FIG. 2 shows a perspective view of a load bearing ring with a wave shaped spring embedded between inner and outer layers of matrix material.

Turning to FIG. 2, the load bearing ring 200 includes a wave shaped spring ("WSS") 210 and a matrix material 220. The WSS 210 is concentric with the axis of rotation and includes the matrix material 220 positioned radially on each side thereof. Suitable materials for the WSS 210 include, but are not limited to, metal (e.g., steel, aluminum), thermoplastic, thermoset, continuous fiber, discontinuous fiber, or a combination thereof. Suitable matrix materials 220 include, but are not limited to, thermoplastics, thermosets, composites, or combinations thereof. In some embodiments, the matrix material 220 is the same material on either side of the WSS 210. Alternatively, in some embodiments, the matrix material 220 is different on either side of the WSS 210. For example, in one embodiment, the matrix material 220 on the radially outer side 221 of the WSS 210 is compressible and/or has a Poisson ratio of less than or equal to 0 (e.g., an auxetic structure). In another embodiment, the matrix material 220 on the radially inner side 223 of the WSS 210 is incompressible and/or has a Poisson ratio of greater than 0.

Any suitable combination of material for the WSS 210 and matrix materials 220 may be used to form the load bearing ring 200. In some embodiments, suitable combinations of materials include any combination where the tensile modulus of the WSS 210 is at least five (5) times as large as the tensile modulus of the matrix material 220. In some embodiments, the tensile modulus of the WSS 210 is at least ten (10) times as large as the tensile modulus of the matrix material 220. Unless otherwise stated, the tensile modulus of the matrix material refers to the tensile modulus of the matrix material on the radially outer side 221, the tensile modulus of the matrix material on the radially inner side 223, or the average tensile modulus of the matrix material on both the radially outer side 221 and the radially inner side 223. For example, in some embodiments, the tensile modulus of the WSS 210 is at least five (5) times as large as the tensile modulus of the matrix material on the radially outer side 221. In some embodiments, the tensile modulus of the WSS 210 is at least five (5) times as large as the tensile modulus of the matrix material on the radially inner side 223. In some embodiments, the tensile modulus of the WSS 210 is at least five (5) times as large as the average tensile modulus of the matrix material on the radially outer side 221 and the matrix material on the radially inner side 223.

The tensile modulus of the WSS 210, at 10% strain, is at least 50 MPa, at least 100 MPa, at least 200 MPa, at least 300 MPa, at least 400 MPa, at least 500 MPa, at least 600 MPa, at least 700 MPa, at least 800 MPa, at least 900 MPa, at least 1 GPa, or any combination, sub-combination, range, or sub-range thereof. In some embodiments, the tensile modulus of the WSS 210 is greater than 1 GPa at 10% strain. The tensile modulus of the matrix material 220, at 10% strain, is at least 0.1 MPa, at least 1 MPa, at least 5 MPa, at least 10 MPa, between 0.1 MPa and 1 GPa, between 0.1 and 500 MPa, between 0.1 and 250 MPa, between 0.1 and 100 MPa, between 0.1 and 75 MPa, between 1 and 75 MPa, between 0.1 and 50 MPa, between 1 and 50 MPa, between 5 and 50 MPa, between 10 and 50 MPa, or any combination, sub-combination, range, or sub-range thereof. In one embodiment, the tensile modulus of the matrix material 220 is between 0.1 and 75 MPa at 10% strain. In another embodiment, the tensile modulus of the matrix material 220 is between 1 and 75 MPa at 10% strain.

The WSS 210 may be continuous or segmented, and includes any suitable waveform shape extending in the circumferential direction. Suitable waveform shapes include, but are not limited to, sinusoidal, triangular sinusoidal, square sinusoidal, trapezoidal sinusoidal, pulse sinusoidal, hexagonal sinusoidal 211 (FIG. 3A), sawtooth sinusoidal 212 (FIG. 3B), multivariate sinusoidal 213 (FIG. 3C), helical, or a combination thereof. The waveform shape may be consistent throughout the length of the WSS 210 or it may vary. For example, in some embodiments, the frequency, amplitude, wavelength, thickness, and/or width may vary throughout the WSS 210. In some embodiments, the waveform of the WSS 210 includes at least one wavelength within the contact patch of the tire. In some embodiments, the amplitude of the WSS 210 is at least 10% of the thickness of the band. Additionally or alternatively, the waveform shape itself may vary throughout the length of the WSS 210. For example, in some embodiments, the WSS 210 includes alternating waveform shapes within a single wavelength and/or between multiple wavelengths. As will be understood by those skilled in the art, any waveform shape may be used with any suitable material to form the WSS 210. For example, in some embodiments, the WSS 210 includes a metal material with a sinusoidal shape. In some embodiments, the WSS 210 includes a thermoplastic material with a primary sinusoidal shape and a secondary sinusoidal shape.

In some embodiments, the WSS 210 includes a primary waveform and a secondary waveform. The secondary waveform is formed along the primary waveform, and may be continuous throughout the primary waveform or may be segmented (e.g., the secondary waveform may only be formed in the peaks and valleys of the primary waveform). In some embodiments, the secondary waveform includes a smaller wavelength as compared to the primary waveform. In one embodiment, for example, the secondary waveform has a wavelength of no more than half that of the primary waveform. Each of the primary waveform and the second waveform include any suitable waveform shape disclosed herein. In some embodiments, the primary waveform and the second waveform have the same waveform shape. Alternatively, in some embodiments, the primary waveform and the secondary waveform have different waveform shapes. For example, in one embodiment, the primary waveform includes a sinusoidal waveform shape and the secondary waveform includes a square sinusoidal shape with one quarter the wavelength of the primary waveform.

Figure 4A:
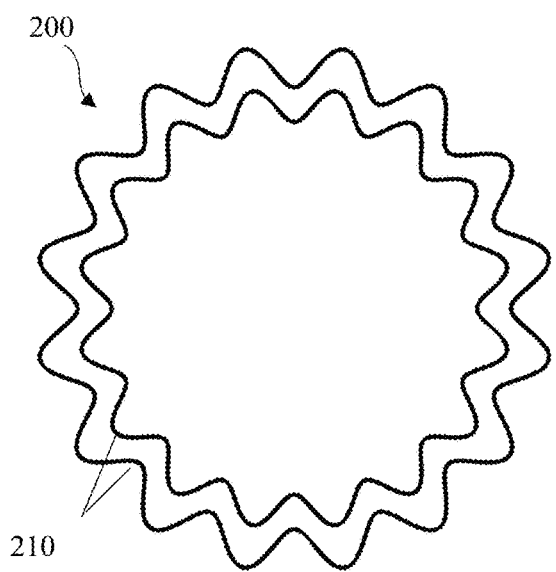
FIGS. 4A-B show various configurations of multiple wave shaped springs according to embodiments of the disclosure. (A) Wave shaped springs in phase. (B) Wave shaped springs out of phase.
Figure 4B:
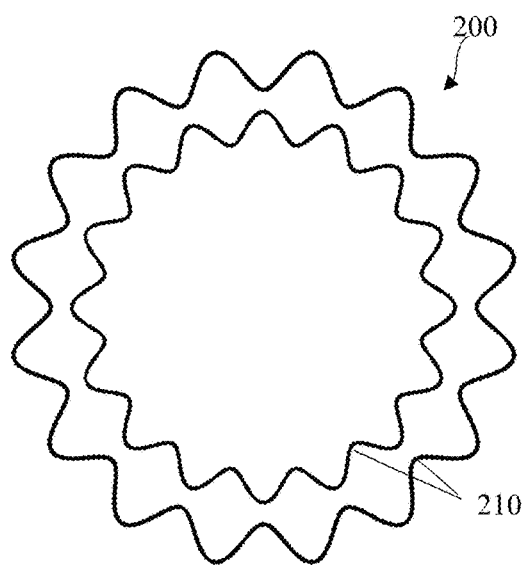
Figure 5A:
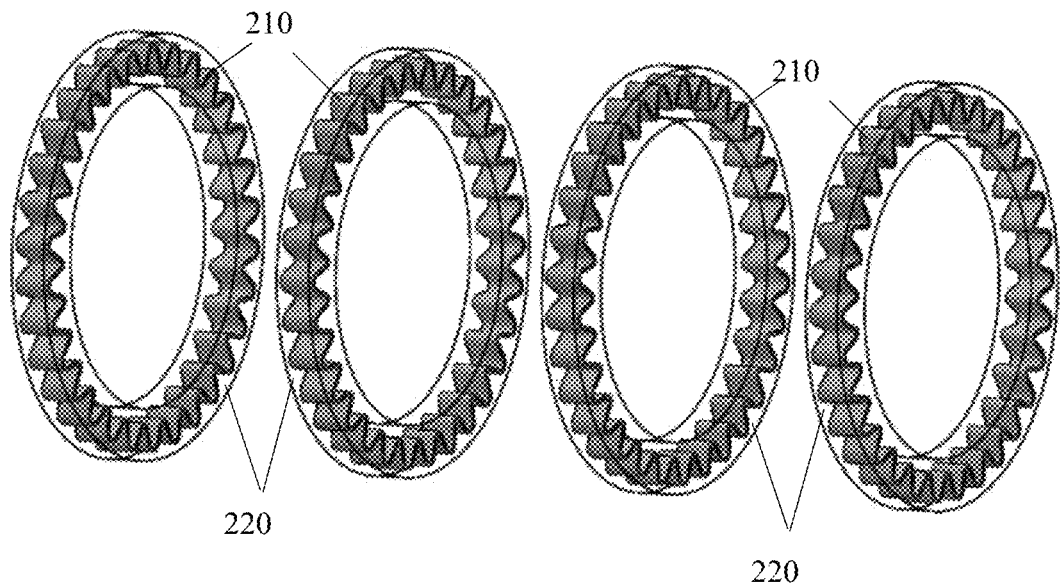
FIGS. 5A-B show a load bearing ring with adjacent wave shaped springs according to an embodiment of the disclosure. (A) Exploded view of the load bearing ring. (B) Perspective view of the load bearing ring.
Figure 5B:
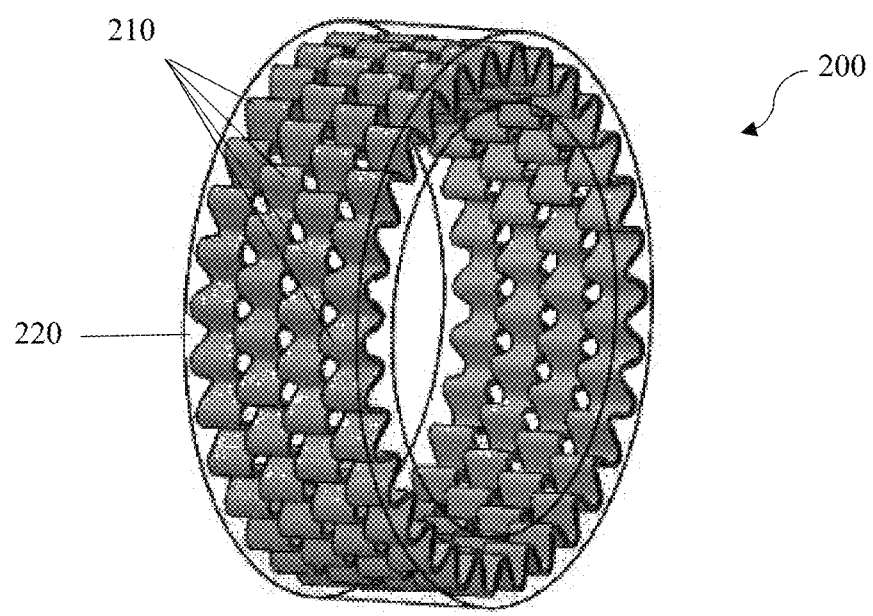

In some embodiments, the load bearing ring 200 includes more than one WSS 210. In such embodiments, each WSS 210 may have waves of the same or different diameters, may have the same or different geometries and/or materials, may be in phase or out of phase with one or more other WSS, or a combination thereof. In some embodiments, the load bearing ring 200 includes two or more concentric WSSs 210 (i.e., stacked in the radial direction). For example, in one embodiment, the load bearing ring 200 includes concentric WSSs 210 having waves that are in phase (FIG. 4A), out of phase (FIG. 4B), or anywhere in between. In some embodiments, the load bearing ring 200 includes two or more adjacent WSSs 210 (i.e., next to each other axially). For example, in one embodiment, as illustrated in FIGS. 5A-B, the load bearing ring 200 includes adjacent WSSs 210, where each WSS 210 is out of phase with the next. Additionally or alternatively, in some embodiments, the load bearing ring 200 may include both concentric and adjacent WSSs 210, such that at least one adjacent WSS 210 includes two or more concentric WSSs 210.

Figure 6A:
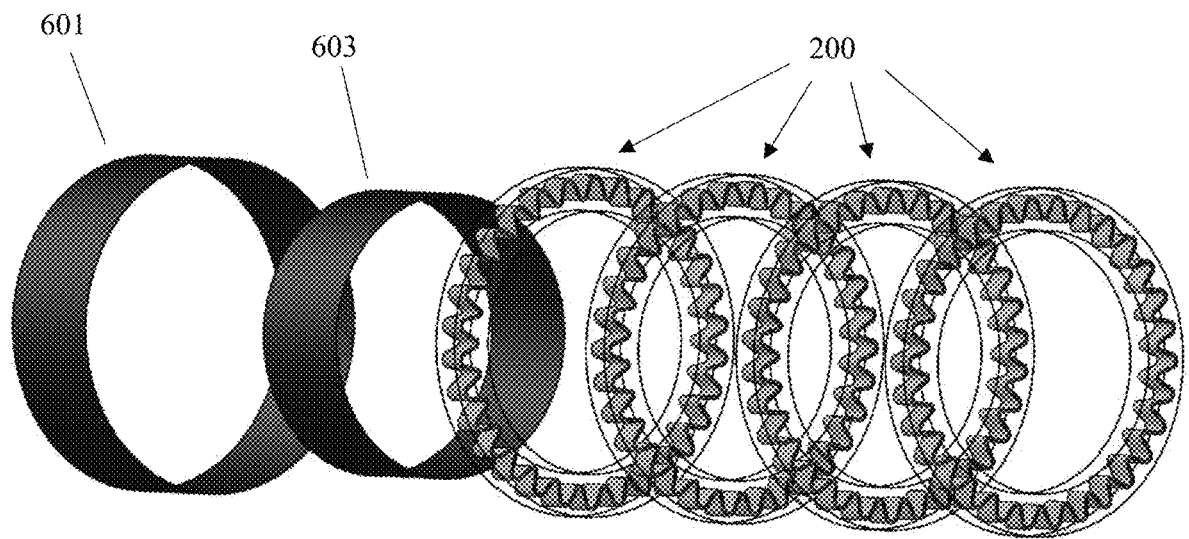
FIGS. 6A-B show a load bearing ring with adjacent wave shaped springs according to an embodiment of the disclosure. (A) Exploded view of the load bearing ring. (B) Perspective view of the load bearing ring.
Figure 6B:
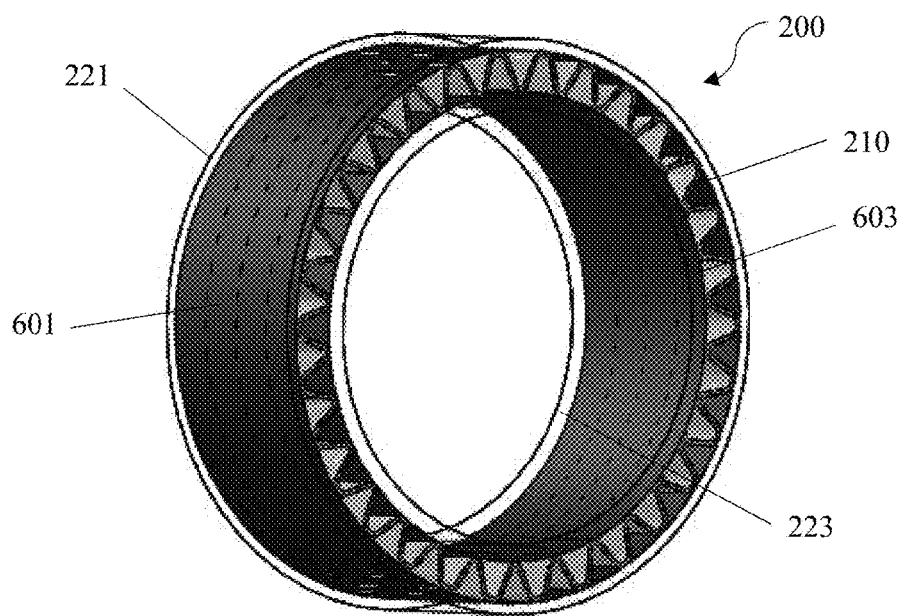
Figure 7:
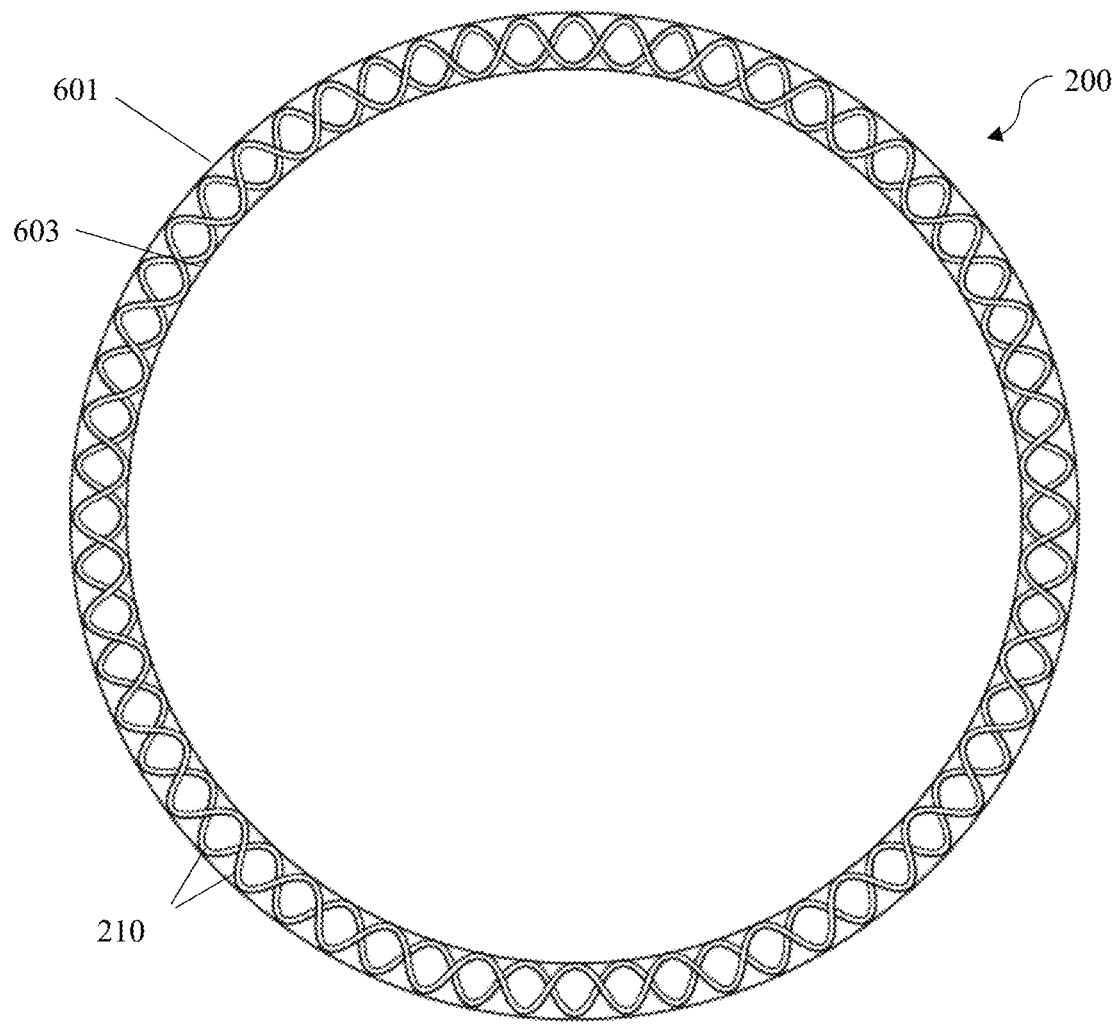
FIG. 7 shows a side view of a load bearing ring including phase shifted adjacent wave shaped springs.

Turning to FIGS. 6A-7, in some embodiments, the load bearing ring 200 includes a top belt 601 and/or a bottom belt 603 on the radially outer side and/or the radially inner side of the load bearing ring 200, respectively. In some embodiments, the top belt 601 and/or the bottom belt 603 is positioned between the WSS 210 and the matrix material 220 on the radially outer side 221 and/or the radially inner side 223, respectively. Additionally or alternatively, in some embodiments, the matrix material 220 on the radially outer side 221 and/or the radially inner side 223 is positioned between the WSS 210 and the top belt 601 and/or the bottom belt 603, respectively. For example, in one embodiment, the load bearing ring 200 includes a top belt 601 positioned between the WSS 210 and the matrix material 220 on the radially outer side 221, and a bottom belt 603 positioned between the WSS 210 and the matrix material 220 on the radially inner side 223. Although shown in FIGS. 6A-7 with multiple adjacent WWSs 210, as will be appreciated by those skilled in the art, the disclosure is not so limited and may include any other load bearing ring 200 configuration disclosed herein.

Referring again to FIG. 1, In some embodiments, the non-pneumatic tire 100 optionally includes spokes and/or webbing 300 between the load bearing ring 200 and the inner annular portion 120. The spokes and/or webbing 300 include any suitable shape and size, and may be formed from any suitable material such as, but not limited to, thermoplastic, thermoset, metal, continuous fiber, discontinuous fiber, composite, or a combination thereof. Suitable radial shapes include, but are not limited to, sinusoidal, web, straight, curved, any other suitable shape, or a combination thereof. Suitable lateral shapes include, but are not limited to, continuous through the width of the tires, discontinuous through the width of the tire, or a combination thereof. In one embodiment, the load bearing ring construction is incorporated into the webbing (e.g., matrix material and WSS). In another embodiment, the spokes and/or webbing 300 include multiple layers of WSS webbing between the load bearing ring 200 and the inner annular surface 120. In some embodiments, the spokes and/or webbing 300 is tensionable or adjustable for changing load capacity. In some embodiments, the spokes and/or webbing 300 link the load bearing ring 200 to the inner annular portion 120.

However, as will be appreciated by those skilled in the art, the spokes and/or webbing 300 is optional, and therefore not required. Accordingly, each embodiment disclosed herein is contemplated both with the spokes and/or webbing 300 and without the spokes and/or webbing 300 (e.g., where the load bearing ring 200 is in direct contact with the outer annular portion 110 and the inner annular portion 120).

In some embodiments, the tire 100 includes a radially outer sidewall and/or a radially inner sidewall. When present, the radially outer sidewall extends from a radially outer edge of the annular outer surface 110 to a radially outer edge of the annular inner surface 120. Similarly, when present, the radially inner sidewall extends from a radially inner edge of the annular outer surface 110 to a radially inner edge of the annular inner surface 120. As will be understood by those skilled in the art, the non-pneumatic tires 100 of the present disclosure are not inflated with pressurized air and thus do not require a radially outer sidewall or radially inner sidewall to form an air-tight cavity. Nevertheless, when present, the radially outer sidewall and/or radially inner sidewall may partially carry the load on the tire, provide lateral stability to the tire, and/or prevent debris from entering and possibly damaging the inner portion of the tire.

Also provided herein, in some embodiments, are methods of forming a non-pneumatic tire 100 and load bearing ring 200. In some embodiments, the WSS 210 for the load bearing ring 200 may be created using the following a general parametric equation using Cartesian coordinates:

$$X=(R+(A\times\sin(n\times\Theta)))\times\cos(\Theta)+XC$$

$$Y=(R+(A\times\sin(n\times\Theta)))\times\sin(\Theta)+YC$$

Where R is the circle radius, A is the amplitude of the sinusoid, $\Theta$ is the parameter angle (for a full circle 0 to $2\pi$), n is the number of sinusoids on the circle, and XC, YC is the circle's center point. The amplitude, frequency (number of sinusoids), and the wheel radius are all independent variables. The spring rate and load bearing properties of the WSS 210 may be changed by modifying these variables. Additionally or alternatively, the spring rate and load bearing properties of the WSS 210 may be changed by modifying the thickness and/or material of the WSS 210. As will be appreciated by those skilled in the art, the equation above is only one example of how the WSS 210 may be created and is not intended to limit the scope of the present disclosure.

The non-pneumatic tire 100 according to one or more of the embodiments disclosed herein is capable of carrying a load without internal air pressure. In some embodiments, the non-pneumatic tire 100 carries a load from the outer annular surface 110 through the load bearing ring 200 to the inner annular surface 120. In one embodiment, when carrying a load the spokes and/or webbing 300 are in tension outside a contact patch of the tire and both in compression and tension within the contact patch of the tire (e.g., as a spoke within the contact patch bends, one side will be in compression while the opposite side will be in tension). In another embodiment, the inner layer of matrix material 223 and/or the outer layer of matrix material 221 are put into shear as the tension and/or compression distorts the WSS 210. In another embodiment, the amplitude and frequency of the WSS 210 can be tuned to create a flat contact patch, which provides improved stability and traction as compared to existing non-pneumatic tires. In a further embodiment, the crests and troughs of the WSS design of the load bearing ring 200 act to reduce the stresses coming into and out of the contact patch, providing improved performance and durability.

All publications, patents, and patent applications mentioned in this specification are herein incorporated by reference to the same extent as if each individual publication, patent, or patent application was specifically and individually indicated to be incorporated by reference.

What is claimed is:

1. A non-pneumatic tire comprising:
   an outer annular portion forming an outer surface of the tire;
   an inner annular portion for contacting a wheel hub;
   a load bearing ring positioned between the outer annular portion and the inner annular portion; and
   a webbing portion positioned between the load bearing ring and the inner annular portion,
   wherein the load bearing ring comprises:
      a ring of matrix material; and
      a wave shaped spring embedded in the ring of matrix material, the ring of matrix material having an inner layer of matrix material positioned radially inward of the wave shaped spring and an outer layer of matrix material positioned radially outward of the wave shaped spring, and
      wherein along a length of the wave shaped spring, the wave shaped spring is in contact with the inner layer of matrix material and the outer layer of matrix material.

2. The non-pneumatic tire of claim 1, wherein a tensile modulus of the wave shaped spring is at least five times a tensile modulus of at least one of the inner layer of matrix material, the outer layer of matrix material, and an average of the inner layer of matrix material and the outer layer of matrix material.

3. The non-pneumatic tire of claim 1, wherein a tensile modulus of the wave shaped spring is at least ten times a tensile modulus of at least one of the inner layer of matrix material, the outer layer of matrix material, and an average of the inner layer of matrix material and the outer layer of matrix material.

4. The non-pneumatic tire of claim 1, wherein the wave shape spring comprises a tensile modulus, at 10% strain, of at least 50 MPa.

5. The non-pneumatic tire of claim 1, wherein at least one of the inner layer of matrix material and the outer layer of matrix material comprises a tensile modulus, at 10% strain, of between 0.1 MPa and 500 MPa.

6. The non-pneumatic tire of claim 1, wherein the wave shaped spring includes at least one of metal, thermoplastic, thermoset, continuous fiber, and discontinuous fiber.

7. The non-pneumatic tire of claim 1, wherein the inner layer of matrix material includes at least one of thermoplastics, thermosets, and composites.

8. The non-pneumatic tire of claim 1, wherein the outer layer of matrix material includes at least one of thermoplastics, thermosets, and composites.

9. The non-pneumatic tire of claim 1, wherein the inner layer of matrix material and the outer layer of matrix material are the same material.

10. The non-pneumatic tire of claim 1, wherein the inner layer of matrix material and the outer layer of matrix material are the different materials.

11. The non-pneumatic tire of claim 10, wherein the outer layer of matrix material has a Poisson ratio of less than or equal to 0.

12. The non-pneumatic tire of claim 10, wherein the inner layer of matrix material has a Poisson ratio of greater than 0.

13. The non-pneumatic tire of claim 1, wherein the wave shaped spring comprises a waveform shape including at least one of sinusoidal, triangular sinusoidal, square sinusoidal, trapezoidal sinusoidal, pulse sinusoidal, hexagonal sinusoidal, sawtooth sinusoidal, and multivariate sinusoidal.

14. The non-pneumatic tire of claim 1, wherein at least one of frequency, amplitude, wavelength, thickness, and width varies throughout the wave shaped spring.

15. The non-pneumatic tire of claim 1, wherein the outer annular portion includes at least one of thermoplastics, thermosets, and composites.

16. The non-pneumatic tire of claim 1, wherein the inner annular portion includes at least one of metal, polymer, composite, and ceramic.

17. The non-pneumatic tire of claim 1, wherein the load bearing ring comprises at least one additional wave shaped spring.

18. The non-pneumatic tire of claim 17, wherein the wave shape spring and the at least one additional wave shaped spring are selected from the group consisting of concentric, adjacent, and a combination thereof.

19. The non-pneumatic tire of claim 1, further comprising webbing between the load bearing ring and the inner annular portion.

20. A non-pneumatic tire comprising:
   an outer annular portion including at least one of thermoplastics, thermosets, and composites;
   an inner annular portion including at least one of metal, polymer, composite, and ceramic; and
   a load bearing ring positioned between the outer annular portion and the inner annular portion, the load bearing ring comprising:
      an inner layer of matrix material having a Poisson ratio of greater than 0;
      an outer layer of matrix material having a Poisson ratio of less than or equal to 0; and
      a wave shaped spring embedded between the inner layer of matrix material and the outer layer of matrix material, the wave shaped spring comprising a tensile modulus, at 10% strain, of at least 50 MPa;
   wherein the wave shaped spring is in contact with the inner layer of matrix material and the outer layer of matrix material along a length of the wave shaped spring;
   wherein a tensile modulus of the wave shaped spring is at least five times a tensile modulus of at least one of the inner layer of matrix material, the outer layer of matrix material, and an average of the inner layer of matrix material and the outer layer of matrix material; and
   wherein the wave shaped spring comprises a waveform shape including at least one of sinusoidal, triangular sinusoidal, square sinusoidal, trapezoidal sinusoidal, pulse sinusoidal, hexagonal sinusoidal, sawtooth sinusoidal, and multivariate sinusoidal.

* * * * *